United States Patent [19]

Sannel et al.

[11] Patent Number: 5,009,332

[45] Date of Patent: Apr. 23, 1991

[54] OUTPUT HOPPER APPARATUS

[75] Inventors: Benjamin H. Sannel, St. Louis Park; Steven A. Miller, Mahtomedi; Robert A. Sella, Minneapolis, all of Minn.

[73] Assignee: Datacard Corporation, Minnetonka, Minn.

[21] Appl. No.: 276,236

[22] Filed: Nov. 23, 1988

[51] Int. Cl.⁵ .......................... B07C 9/00; B65H 29/44
[52] U.S. Cl. ..................................... 209/652; 271/181; 271/303
[58] Field of Search .............................. 209/651–654, 209/657, 933; 101/2; 271/177, 178, 180, 181, 303–305; 414/798.5–798.7

[56] References Cited

U.S. PATENT DOCUMENTS

| | | |
|---|---|---|
| 2,251,596 | 8/1941 | O'Malley . |
| 2,778,638 | 1/1957 | Whillock et al. ............ 414/798.5 X |
| 3,266,798 | 8/1966 | Bleiman ...................... 271/181 X |
| 3,814,415 | 6/1974 | Hunter et al. ..................... 271/181 |
| 4,019,730 | 4/1977 | Staudinger et al. ............... 271/181 |
| 4,046,371 | 9/1977 | Sevak ......................... 414/798.5 X |
| 4,072,420 | 2/1978 | Wicks et al. . |
| 4,073,585 | 2/1978 | Kobayashi et al. . |
| 4,106,766 | 8/1978 | Stefansson ....................... 271/181 |
| 4,245,833 | 1/1981 | Akerstrom ..................... 271/177 X |
| 4,251,000 | 2/1981 | Templeton .................... 271/303 X |
| 4,264,067 | 4/1981 | Adams et al. . |
| 4,271,012 | 6/1981 | LaManna et al. .................. 209/653 |
| 4,275,875 | 6/1981 | Akers ........................... 271/305 X |
| 4,373,713 | 2/1983 | Loebach . |
| 4,418,824 | 12/1983 | Gorgone et al. ............... 271/181 X |
| 4,441,702 | 4/1984 | Nagel et al. ....................... 271/177 |
| 4,506,882 | 3/1985 | Ito et al. . |
| 4,519,600 | 5/1985 | Warwick et al. . |
| 4,561,352 | 12/1985 | Svyatsky et al. ..................... 101/2 |
| 4,718,660 | 1/1988 | Daboub ....................... 271/177 X |

FOREIGN PATENT DOCUMENTS

| | | | |
|---|---|---|---|
| 2555974 | 6/1985 | France ........................ 271/178 |
| 57-203648 | 12/1982 | Japan ......................... 271/303 |
| 0671837 | 5/1952 | United Kingdom ............ 414/798.5 |

Primary Examiner—Margaret A. Focarino
Assistant Examiner—Edward M. Wacyra
Attorney, Agent, or Firm—Merchant, Gould, Smith, Edell, Welter & Schmidt

[57] ABSTRACT

A card output hopper apparatus (20) receives cards (82) and delivers them to a preselected card tray (42). The output hopper rotatable deflector (52). The deflector (52) is situated in a recieving position to deflect a delivered card (82) toward a card tray (42). The deflector (52) rotates as the card is delivered to drive the card past a retainer (64) and onto a card stack in the card tray (42). The deflector (52) is also rotatable to a receiving position to deflect the card toward an opposing card tray (44).

18 Claims, 10 Drawing Sheets

OUTPUT HOPPER APPARATUS

BACKGROUND OF THE INVENTION

The present invention relates to an output hopper apparatus receiving cards from processing stations and transferring cards onto sorted and ordered stacks. Card output hopper mechanisms are widely used in systems for embossing and processing cards requiring stacking and sorting. The output hopper apparatus receives cards from the processing modules and stacks the cards on a proper card stack in proper sequence.

Prior methods of stacking and sorting processed cards have many associated problems. Cards often jam in the mechanism or are stacked in the wrong order. This often causes problems in identifying and processing the cards. In addition to clogging the mechanism with jammed cards, jamming damages the cards. This requires re-embossing of the damaged cards and additional delays and costs. Prior methods of stacking used deflecting arms for deflecting only. The cards are not driven by the deflecting arms onto the card stacks. Cards are pushed onto the card stacks by additional driving rollers or by the next card. This method leads to cards being inserted in the stack in the wrong order and causes problems in further processing.

The present invention addresses these problems associated with stacking and sorting processed cards. It is apparent that an improved mechanism and method for receiving processed cards and properly sorting and stacking the cards are needed. The present invention solves these problems and others associated with stacking and sorting processed cards.

SUMMARY OF THE INVENTION

In the present invention, plastic cards being processed in a card embossing system are carried through card processing modules on a card transport to an output position where output hopper feed rollers receive cards from a preceding module. Sensors along the card transport path determine the status of each card as acceptable or rejected. The status is used logically, wherein output hopper deflecting means direct received cards either to an accepted card tray or a reject card tray. In a second embodiment, cards may also pass directly through the deflector along a third direction for additional processing or sorting. The deflecting means separate the accepted card tray from the reject card tray. If a second embodiment is used in which a slot runs through the length of a deflector allowing cards to pass along a third direction, additional card trays may also be used.

Cards feed through a set of rollers to the deflecting means. The deflecting means comprise a pivotally mounted deflector arm driven by a stepper motor or solenoid for moving the deflector into a position for accepting cards and deflecting the cards toward the proper stack. The deflector acts to deflect cards and also serves as card driving means for driving the cards into the card trays. By driving the cards onto an end of the card stack rather than just deflecting cards toward the tray, cards will not be stacked out of sequence, as when cards are only deflected, and problems arising from cards being stacked in improper order are avoided.

In operation, the deflector is moved to one side of the center line of the feed rollers. Cards are fed to the deflector and directed along side and away from the deflector. After the trailing edge of the card passes a photocell between the feed rollers, the deflector begins its motion after a built in time delay. The deflector then rotates toward the proper card tray, sweeping the card past a card stack retainer into a card tray and onto the card stack. The feed rollers also help to push the cards onto the card stack by pushing the trailing edge of the card around the periphery of the roller and toward the card stack. The receiving angle and path swept by the deflector is adjustable for various types and thicknesses of cards by adjusting the number of steps moved by the stepper motor or by adjusting the solenoid position and the travel of its plunger, thereby varying the receiving angle and angle of rotation by the deflector. For driving cards into the opposing reject tray, the deflector motion is reversed to a mirror image of the motion associated with driving cards into the acceptable card tray.

Cards are maintained in their stack position by a retainer located at the deflector end of the card tray, and a tensioning member or weight positioned at the opposite end of the card tray. The tension between the retainer at one end and the tensioning member at the other end of the card tray maintains the cards in a stack so that adjacent cards remain in contact, avoiding problems associated with improper sequencing and loose cards.

In a second embodiment, the deflector stops at three receiving positions for deflecting cards. In addition to moving to one side or the other for deflecting cards into the trays, the deflector stops at a center position. A slot running lengthwise through the deflector directs the card straight through the deflector. Additional rollers then drive the card onto another deflector or additional processing stations. It can be appreciated that a series of deflectors may be arranged in this manner, providing for deflecting and driving cards onto a number of card stacks, thereby increasing holding capacity and enabling greater diversity in card classification.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

In the drawings wherein like reference numerals and letters indicate corresponding elements throughout the several views:

FIG. 12 is a top view of a second embodiment taken along line 12—12 of FIG. 11, illustrating the deflecting means in a receiving position for passing a card straight through;

DETAILED DESCRIPTION OF THE PRESENT INVENTION

Figure 1A:
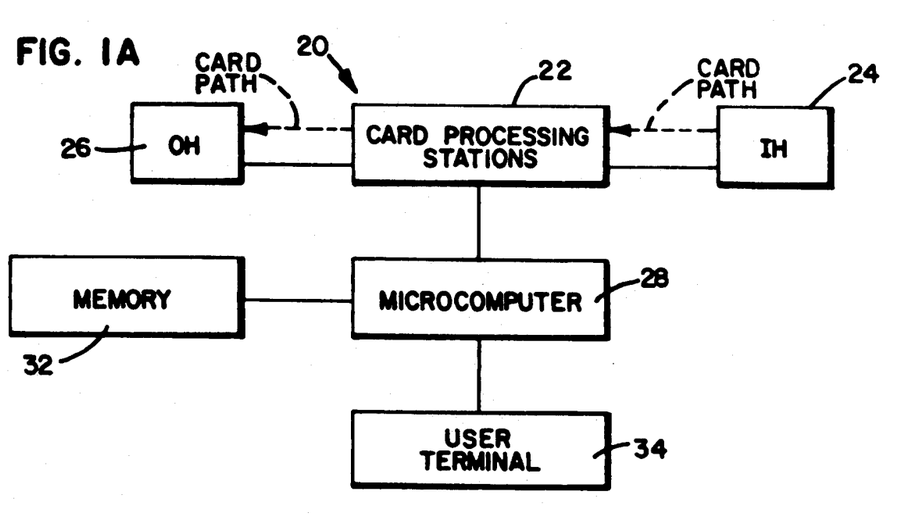
FIG. 1A is a block diagram of a card embossing apparatus implementing an output hopper apparatus of the present invention.

In FIG. 1A a block diagram is shown of an embossing and printing apparatus implementing an output hopper apparatus according to the present invention. A card embossing and printing apparatus shown generally at 20 comprises card processing stations 22 which perform various printing and embossing operations on plastic cards. Cards are input by means of an input hopper 24, and are then processed along a card transport path and delivered to an output hopper 26. The embossing operations are programmably controlled by a microcomputer 28 having a memory 32. Specifications and requirements are input into the microcomputer 28 by means of a user terminal 34. Adjustments may then be made to the processing operations for the particular needs of the user.

Figure 1B:
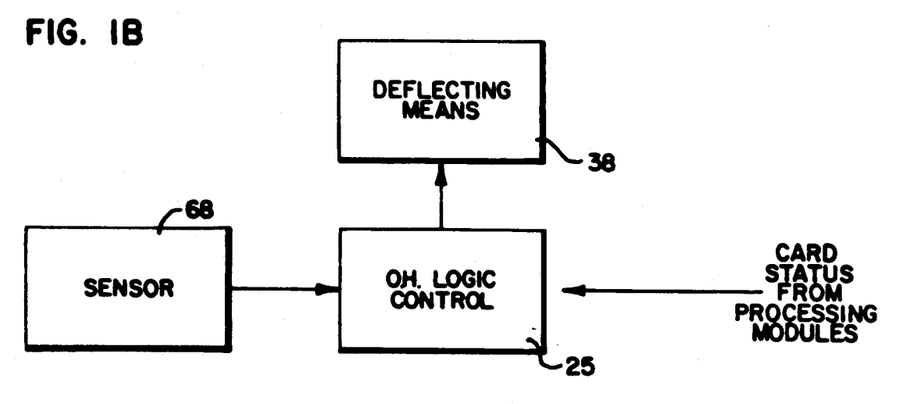
FIG. 1B is a block diagram of the output hopper control logic according to the principles of the present invention.
Figure 2:
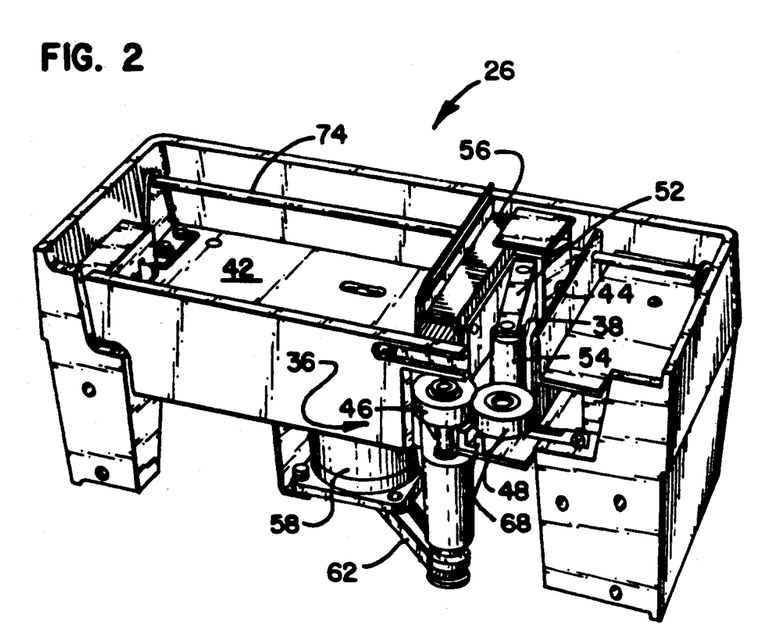
FIG. 2 is a perspective view of an output hopper apparatus of the present invention.

As shown in FIG. 1B, deflecting means 38 is controlled by the output hopper internal logic control 25. Status of each card as rejected or acceptable is assigned as the card is processed. As the card passes photocell sensor 68 (shown in FIG. 2), the logic control moves the deflecting means to a receiving position in accordance with the status of the card. As shown in FIG. 2, an output hopper 26 includes feed means 36 wherein cards are received by the output hopper 26. Cards pass to the deflecting means 38 and then to either an accepted card tray 42 or a reject card tray 44.

Figure 3:
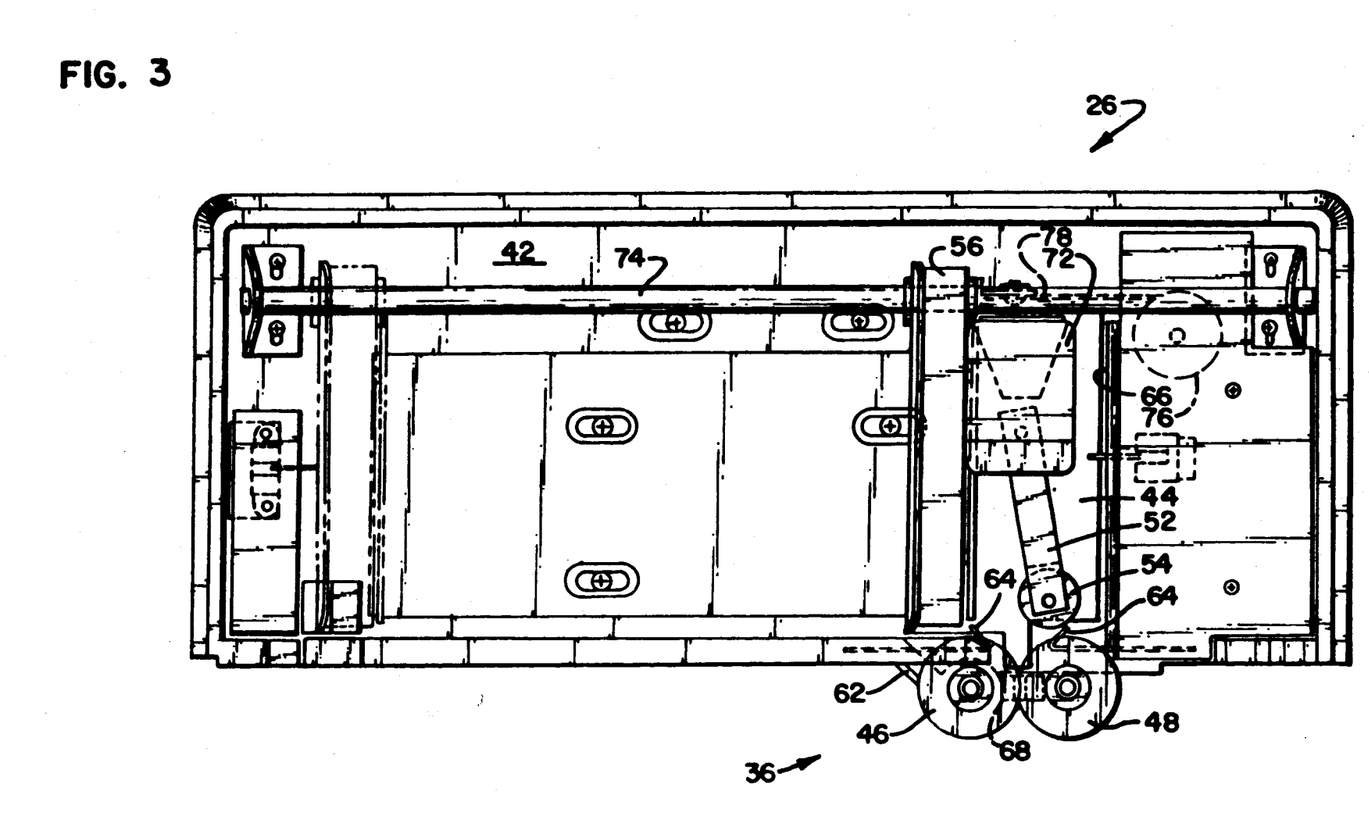
FIG. 3 is a top plan view illustrating an output hopper apparatus as shown in FIG. 2.

As shown in FIG. 3, feed means 36 comprise a drive roller 46 and idler roller 48. A photocell 68 is located below the feed means 36 for detecting passage of cards through the feed means 36. The drive roller 46 is driven by a motor 58 and a drive belt 62. The drive roller 46 engages the idler roller 48 by friction along the nip of the rollers. The rollers 46 and 48 engage cards by friction of the rubber rollers against the card surface. In this manner, the idler roller 48 rolls along with a card as the card is passed through the feed means 36. Friction against the drive roller 46 re-engages the idler roller 48 after the card has passed through the feed means 36, thereby driving the idler roller 48 when cards are not present between the idler roller 48 and drive roller 46.

Figure 4:
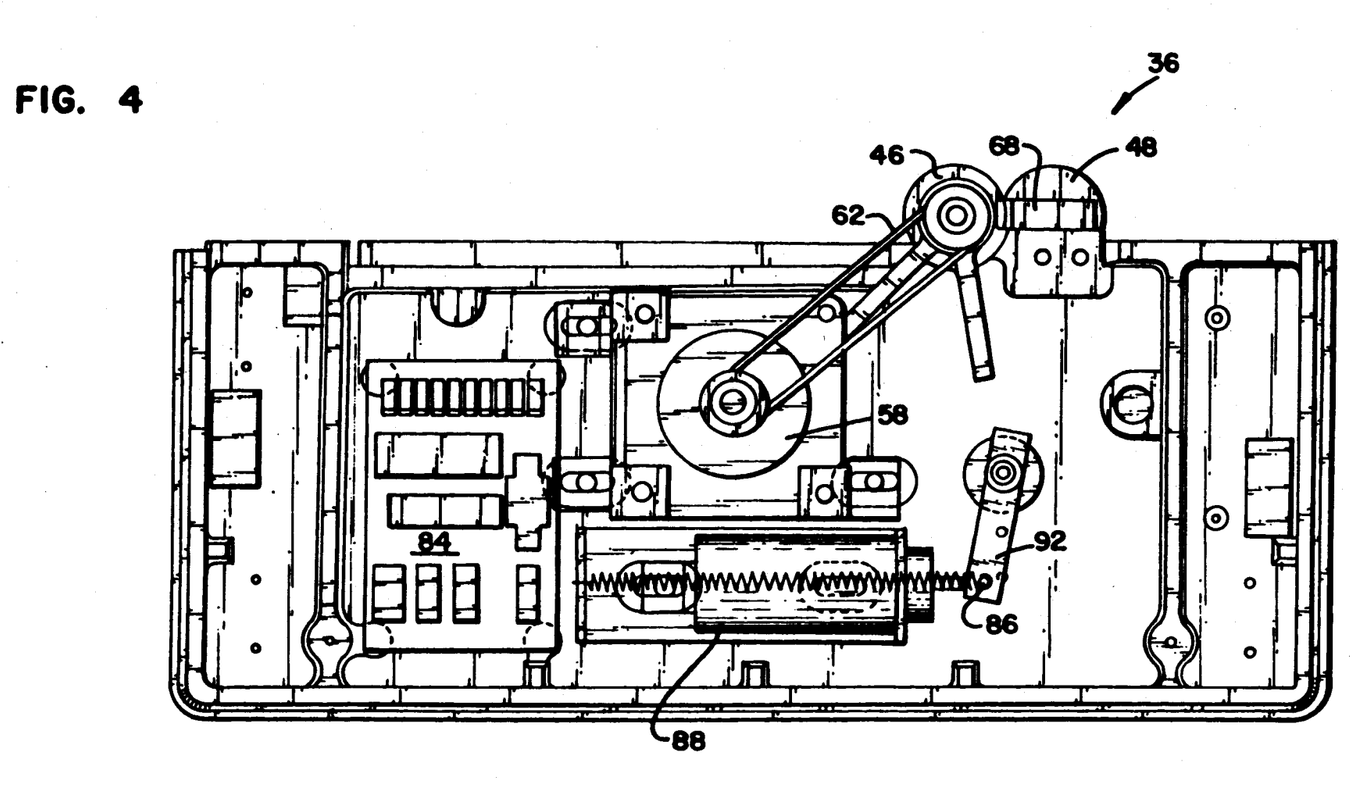
FIG. 4 is a bottom plan view illustrating an output hopper apparatus shown in FIG. 2.

After a card has passed through the feed means 36, the card engages the deflecting means 38 comprising a deflector 52 having a deflector roller 54 at its tip. The roller 54 decreases friction against cards and lessens scratching of card surfaces. As shown in FIG. 4, a solenoid 88 drives the deflector 52 through linkage 92 tensioned into a home position by spring 86. When a card has passed through the feed means 36, the card engages the deflector 52 in a receiving position for accepted cards. If sensing determines that a card has a rejected status, the deflector 52 is moved to an opposite position for receiving rejected cards. As a card passes through the feed means 36, it is detected by photocell 68. The deflector 52 rotates to a receiving position for deflecting the card to one of the trays, the receiving position determined by whether the card has an acceptable or rejected status as shown in FIG. 1B. After a card passes by photocell 68, a built in delay expires before the deflector 52 rotates and pushes the card at the correct instant. When pushed into the accepted tray 42, cards are held in place by a tension block 56 and a retainer 64, or in the reject tray 44, cards are held by a back wall 66 and retainer 64. A top plate 72 prevents cards from misaligning upward upon movement onto a card stack. The tension block 56 is maintained in position by a guide rod 74 and tensioned against the card stack by a spring 78 which is coiled onto a reel 76. Circuitry 84 controls the electric motor 58 and the solenoid 88 for actuating the deflector 52 after sufficient delay time.

Figure 5:
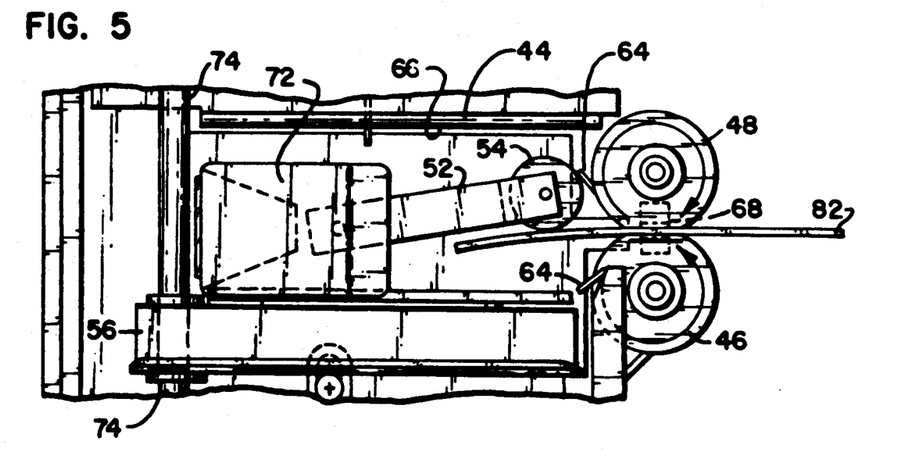
FIG. 5 is a top plan view of a detail illustrating an output hopper apparatus shown in FIG. 2, showing the deflecting means in its home position and a card being fed toward the deflecting means.
Figure 6:
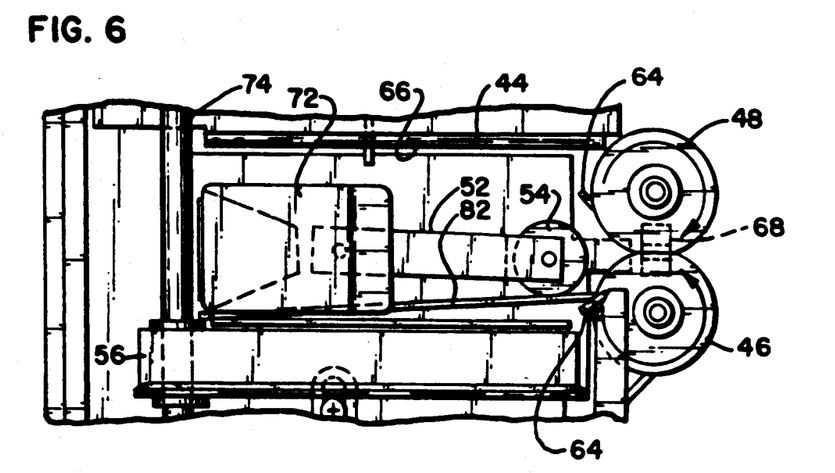
FIG. 6 shows a top plan view of the deflecting means shown in FIG. 5, wherein the deflecting means is rotated partially across the path of its motion to drive a card toward the accepted card tray.
Figure 7:
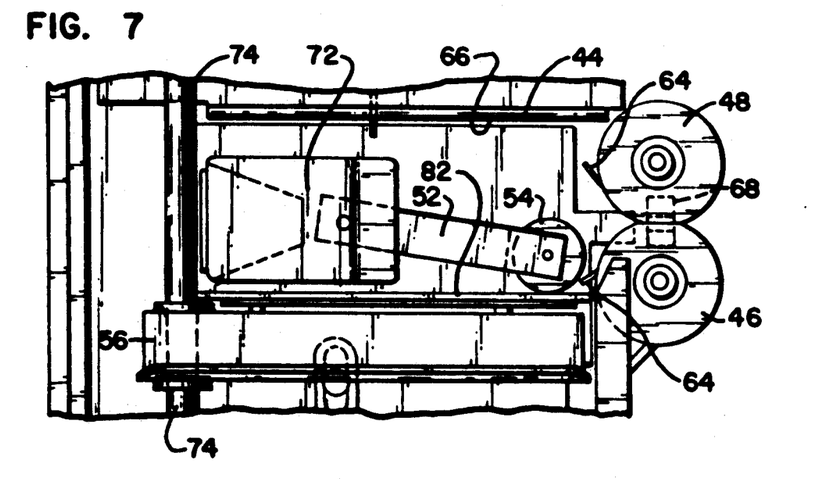
FIG. 7 is a top plan view of the deflecting means shown in FIG. 5, showing the deflecting means fully moved across the path of its motion to a position wherein a card is directed onto the accepted card tray.

As shown in FIG. 5, a card 82 enters the output hopper 26 through feed means 36. The card is gripped in the nip of the drive roller 46 and the idler roller 48. As shown in FIG. 6, when the card 82 is driven through the feed means 36, the card's passage is detected by the photocell 68. The deflector arm 52 rotates so that deflector roller 54 pushes the card 82 towards card tray 42. The trailing edge of the card 82 is also rolled along the periphery of the drive roller 46 until engaging retainer 64. The card 82 bows slightly as contact is maintained with both roller 46 and deflector 52. The deflector 52 continues rotating and pushes the card 82 past the retainer 64, driving the card 82 onto the stack as shown in FIG. 7. The card 82 is stacked and tensioned by a block 56 and the retainer 64. The retainer 64 insures that stacked cards do not fall back onto the deflecting means 38 and also insures that the cards remain in correct sequence. The deflector 52 then moves back to its receiving position and is ready to accept the next card.

Figure 8:
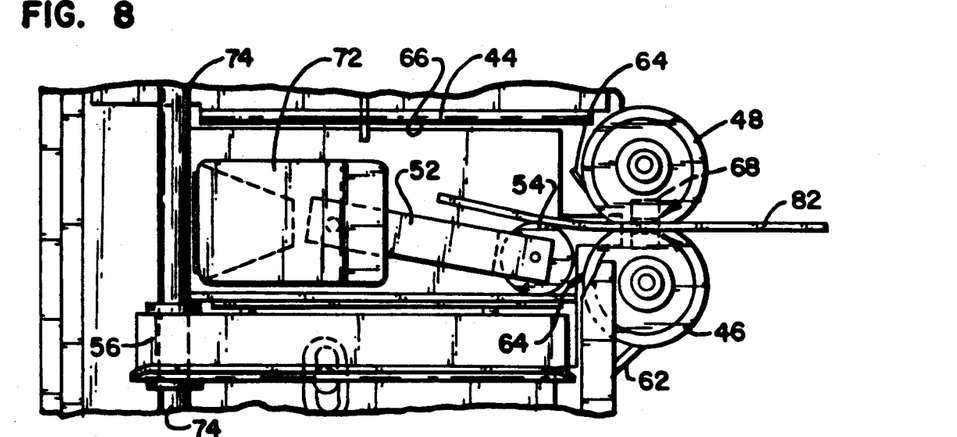
FIG. 8 is a top plan view of the deflecting means shown in FIG. 5, showing the deflecting means in a position for receiving a card to be deflected onto the reject card tray.

As shown in FIG. 8, when a card has a rejected status, the deflector 52 moves toward the accepted card tray 42 to a reject receiving position. The card 82 enters the feed means 36. The card 82 is driven onward until engaging the opposite side of the deflector 52. When the trailing edge of the card 82 has passed through the photocell 68, the deflector 52 is actuated so that the deflector roller 54 pushes the card 82 toward the reject card tray 44.

Figure 9:
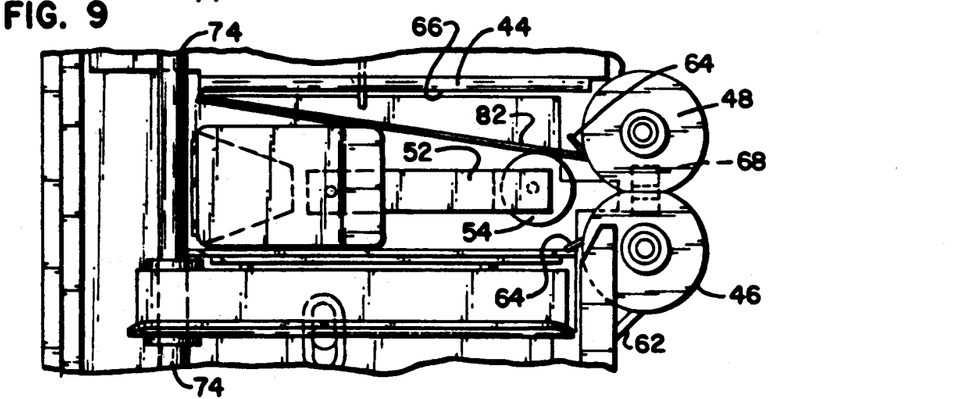
FIG. 9 is a top plan view of the deflecting means shown in FIG. 5, showing the deflecting means moving partially across its path to drive a card onto the reject card tray.
Figure 10:
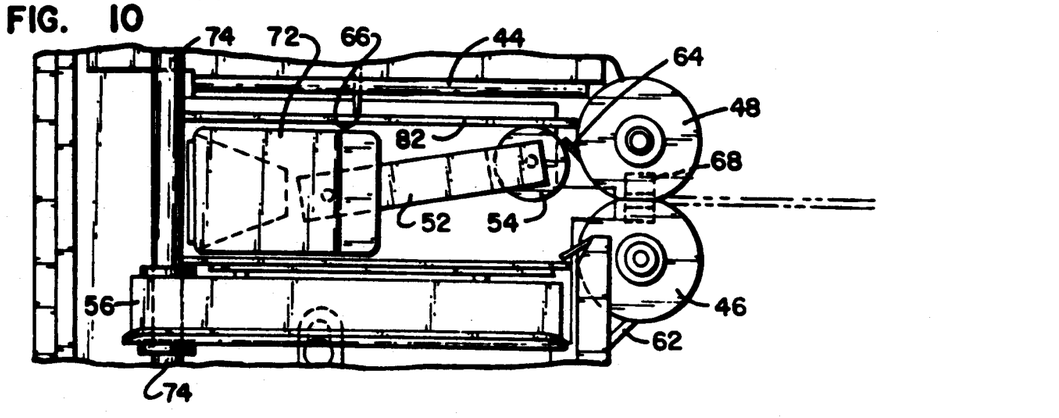
FIG. 10 is a top plan view of the deflecting means shown in FIG. 5, showing the deflecting means fully driven across the path of its motion to drive a card onto the reject tray.
Figure 11:
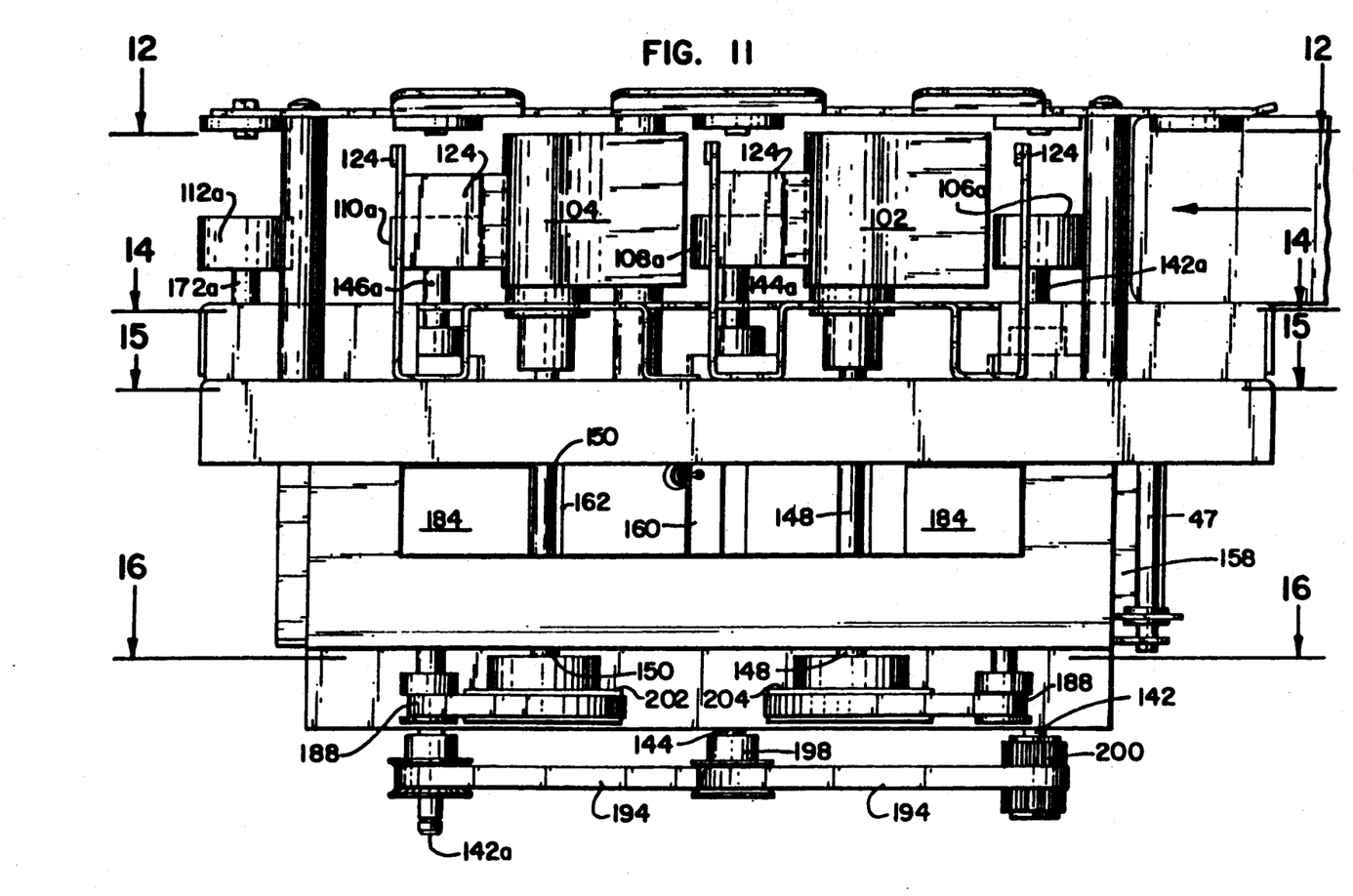
FIG. 11 is an elevational view of a second embodiment of an output hopper apparatus in accordance with the principles of the present invention illustrating a deflecting means comprising slotted deflectors having three receiving positions.

As shown in FIG. 9, the deflector 52 moves toward the reject card tray 44, using the deflector roller 54 to push the card 82 toward the reject card tray 44. The trailing edge of the card 82 is pushed toward the reject card tray 44 by the periphery of the idler roller 48 which is being rolled by friction between the idler roller 48 and the drive roller 46. The card is then pushed past retainer 64, as shown in FIG. 10, and onto the reject card stack against a back retaining wall 66. The deflector 52 is then rotated to its accepted receiving position and ready for the next card.

SECOND EMBODIMENT

Figure 12:
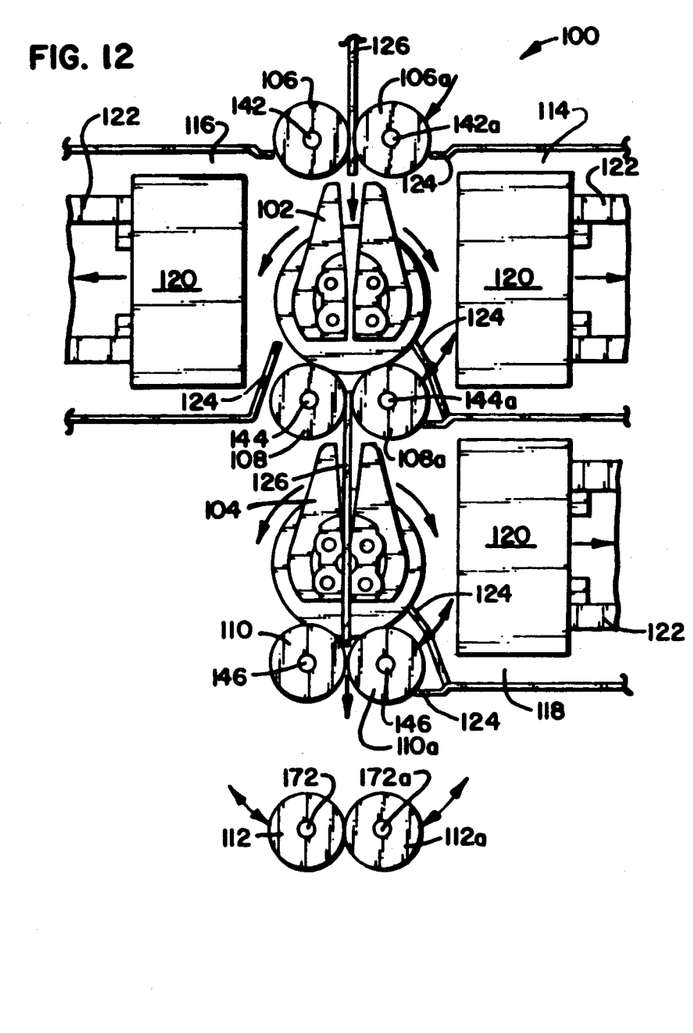

As shown in FIGS. 11-16, the output hopper apparatus 100 comprises a second embodiment having a plurality of deflectors. As shown in FIG. 12, the output hopper apparatus 100 includes a first deflector 102 and a second deflector 104. The deflectors 102 and 104 are slotted so that cards 126 may pass through the deflectors when maintained in a straight-on position as shown in FIG. 12. The deflectors 102 and 104 also rotate for deflecting cards 126 onto card trays 114, 116 or 118.

In operation, card 126 is received at feed rollers 106 and 106a as shown in FIG. 12. The card 126 may be passed straight through the deflector 102 in a receiving position as shown in FIG. 12. The card 126 is fed by rollers 106 and 106a through deflector 102 to rollers 108 and 108a which feed the card 126 to the second deflector 104. The card 126 may then be passed straight through deflector 104 as shown in FIG. 12 to rollers 110 and 110a and fed out through rollers 112 and 112a.

Figure 13:
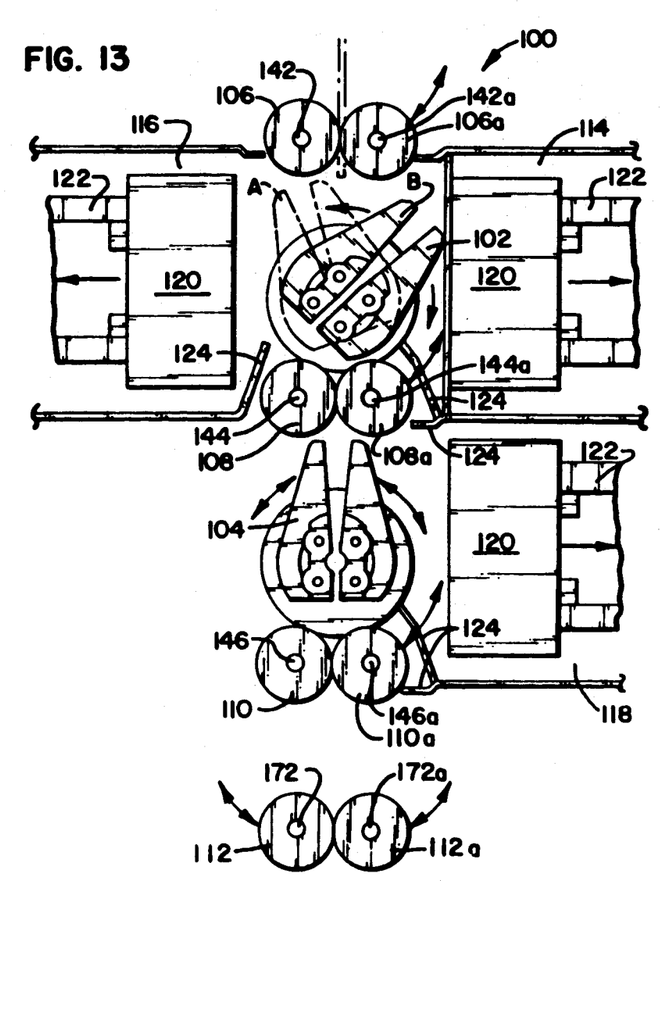
FIG. 13 is a top view of a second embodiment taken along line 12—12 of FIG. 11, illustrating the first deflector in a position for driving the card onto a card stack and also illustrating in phantom the first deflector in a receiving position for deflecting the card toward a side tray.

The deflectors 102 and 104 also rotate to a receiving position as shown at A in FIG. 13. The card 126 is fed by rollers 106 and 106a to the deflector 102 in a receiving position as shown at A. The card 126 engages the deflector 102 in a receiving position and is deflected toward tray 114. The deflector 102 is then rotated towards a position as shown at B thereby pushing the card 126 towards the card tray 114. The trailing edge of the card 126 is rolled around the periphery of roller 106a thereby aiding in directing the card 126 towards the card tray 114. The deflector 102 continues its motion until the card 126 passes by retainer 124 and pushed onto the card tray 114 as shown at position B in FIG. 13. Cards 126 are retained in the card trays 114, 116 and 118 by weights 120 engaging the backside of the cards 126 and by retainers 124 engaging the frontside of cards 126. The weights 120 are slidably mounted on rails 122 so that as cards 126 are added, the weight 120 slides along rail 122 as the card stack expands. The weight 120 maintains the cards 126 in a tightly grouped stack in this manner by pressing each card against adjacent cards in the stack.

Alternatively, the card may be fed to tray 116. The deflector 102 is moved toward tray 114 for receiving a card mirroring the position shown at A. The card 126 engages the deflector 102 and is pushed as deflector 102 rotates toward tray 116 mirroring the motion for directing the card toward tray 114. The trailing edge of the card 126 rolls around the periphery of roller 106 and is pushed past retainer 124 onto tray 116 engaging a weight 120. The deflector 102 moves to a position mirroring that shown at B for driving the card 126 into tray 116.

Cards 126 may also be directed into tray 118. The card 126 is fed through deflector 102 in a straight receiving position as shown in FIG. 12 to rollers 108. Deflector 104 is then moved to a receiving position identical to that shown at A in FIG. 13. The card 126 engages deflector 104 and is deflected towards card tray 118. Roller 108a rolls the trailing edge of the card 126 around the periphery of roller 108a towards card tray 118. The deflector 104 then moves across and drives the card 126 past retainer 124 to a position as shown at B for deflector 102 in FIG. 13 and driving card 126 onto the card tray 118.

Cards 126 may also be passed straight through the output hopper apparatus 100. The deflectors 102 and 104 are maintained in a straight receiving position as shown in FIG. 12. The cards 126 are then fed by rollers 106 and 106a to rollers 108 and 108a through deflector 104 to rollers 110 and 110a and finally out through rollers 112 and 112a.

Figure 14:
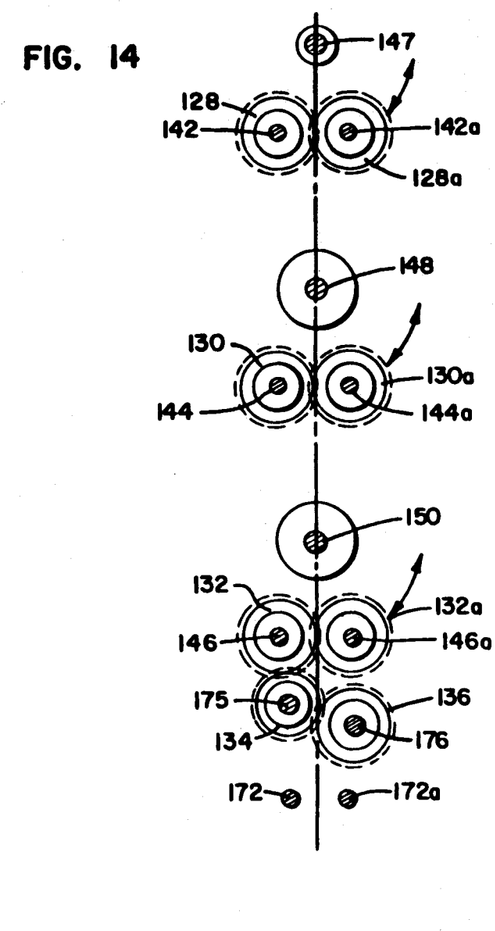
FIG. 14 is a top sectional view of a second embodiment taken along line 14—14 of FIG. 11, illustrating the gear arrangement below the rollers.
Figure 15:
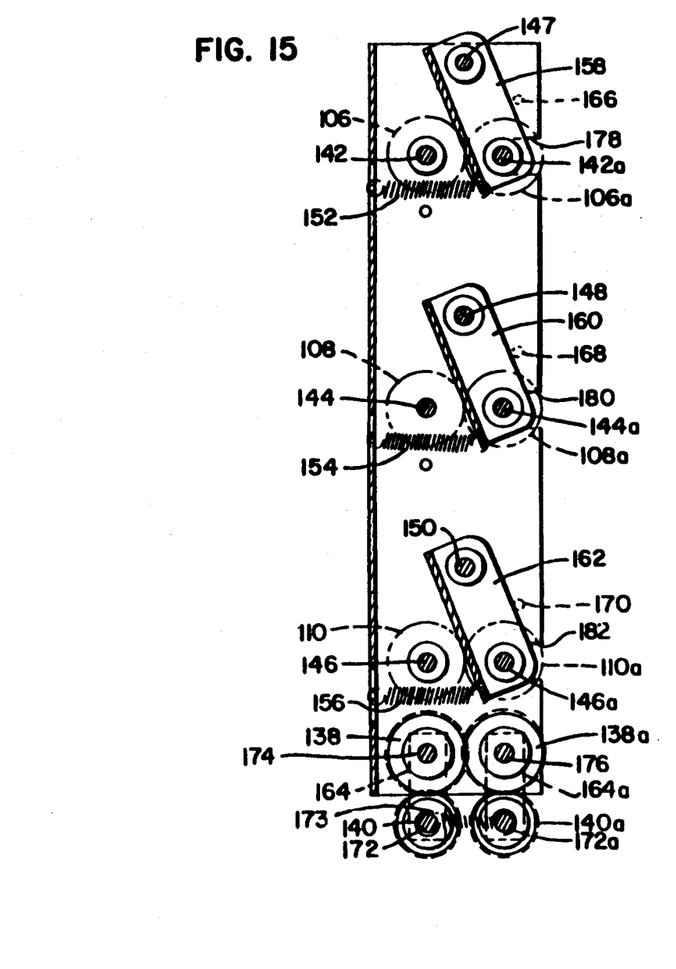
FIG. 15 is a top sectional view of a second embodiment taken along line 15—15 of FIG. 11, illustrating the pivotal roller sets.
Figure 16:
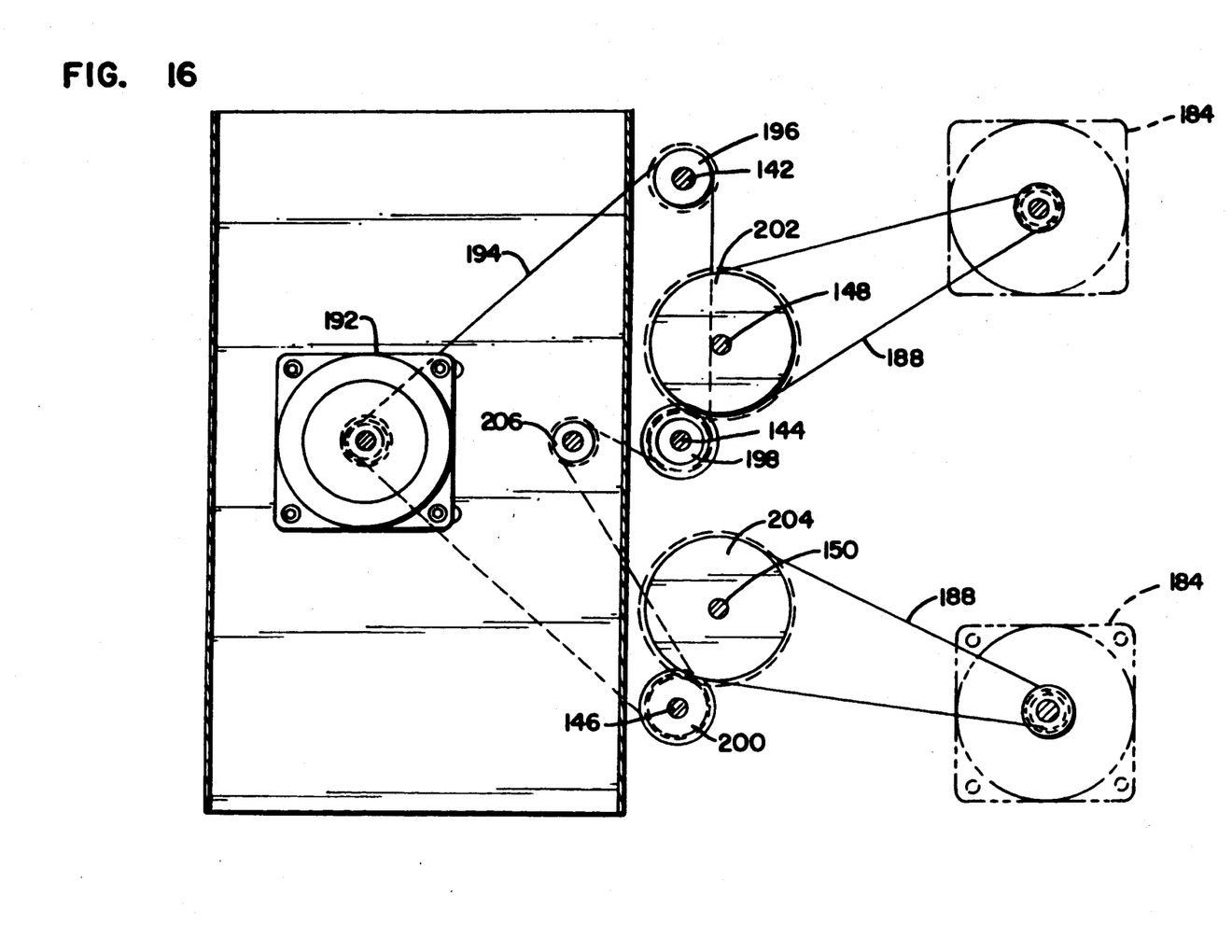
FIG. 16 is a top sectional view of a second embodiment taken along line 16—16 of FIG. 11, illustrating the motor and drive belt arrangement.

As shown in FIGS. 14-16, the rollers are mounted on shafts so that each roller is gear driven and there are no idler rollers. As shown in FIG. 14, the rollers 106 and 106a mount on shafts 142 and 142a having gears 128 and 128a contacting each other. Similarly, rollers 108 and 108a rotate about shafts 144 and 144a and maintain meshing between gears 130 and 130a; rollers 110 and 110a rotate on shafts 146 and 146a maintaining meshing between gears 132 and 132a. Rollers 106, 108 and 110 are driven by belt 194 as shown in FIG. 16. Belt 194 engages pulleys 196, 198 and 200 is also guided by pulley 206. The belt 194 is driven by a motor 192 so that all rollers maintain the same speed. Rollers 106a, 108a and 110a are driven by the gear pairs. The gear pairs 128-128a, 130-130a and 132-132a are always meshed so that all rollers are gear driven and not idler rollers. Shafts 142a, 144a, and 146a are mounted on arms 158, 160 and 162, respectively. The arms 158, 160 and 162 mount on pivot 147 and deflector shafts 148 and 150, respectively. The arms are rotatable so that the shafts 142a, 144a and 146a pivot in slots 178, 180 and 182, respectively. In this manner, the rollers move slightly apart so that a card 126 may pass between the roller pairs. The meshing between gear teeth is maintained between the belt driven gears 128, 130, 132 and the associated shaft gears 128a, 130a, 132a by biasing from springs 152, 154 and 156, respectively. The separation of the gears is limited by the arms 158, 160 and 162 engaging stops 166, 168 and 170, respectively. Motion in the opposite direction is limited by the rollers 106-106a, 108-108a, and 110-110a engaging.

The final set of rollers 112 and 112a mount on shafts 172 and 172a and are held on spring loaded pivot arms 164 and 164a as shown in FIG. 15. Rollers 112 and 112a are driven by gears 140 and 140a through gears 138 and 138a, respectively, mounted on shafts 174 and 176. Gear 136 mounted on shaft 176 above gear 138a is the driving gear for rollers 112 and 112a. An idler gear 134 mounted on idler shaft 175 transfers motion from gear 132 to gear 136, driving shaft 176. In this manner, gear contact is constant and the driving of shaft 146 by belt 194 around pulley 200 as shown in FIG. 16 drives the entire roller set 110-110a and 112-112a. Spring 173 tensions pivot arms 164, 164a together so that contact is maintained between rollers 112 and 112a.

It is to be understood that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad, general meaning of the terms in which the appended claims are expressed.

We claim:

1. An output hopper apparatus for receiving cards passed through card processing stations, the card processing stations having card sensing means determining a status of each card as acceptable or rejected comprising:
   (a) card deflecting means in communication with the card sensing means for deflecting the cards toward one of two or more card stacks and driving the cards onto the card stack, wherein the card deflecting means comprises a rotatable deflector arm including a roller at its tip;
   (b) card feed means for advancing the cards to the card deflecting means;
   (c) card retention means for preventing cards in the card stacks from obstructing a path swept by the card deflecting means, so that the cards are maintained in the card stacks in sequence; and
   (d) card stack tensioning means pressing each card against adjacent cards in the card stacks.

2. An apparatus according to claim 1, wherein the card deflecting means is driven by a stepper motor.

3. An apparatus according to claim 1, wherein the card stack tensioning means comprise a spring tensioned retainer sliding along a rail, moving as the card stack grows.

4. An apparatus according to claim 1, wherein the card deflecting means comprise a deflector having two receiving positions, for deflecting to a reject card stack or an acceptable card stack.

5. An apparatus according to claim 1, wherein the card feed means comprise a pair of rollers, having a drive roller and an idler roller, the drive roller driving the idler roller by friction at the nip of the rollers so that the idler roller continues to roll and drive cards to the card stacks after cards have passed the nip and wherein the roller nearest a predetermined card stack moves a trailing edge of the card around the periphery of the roller so that the roller rotation aids the card deflecting means in urging cards past the card retention means.

6. An apparatus according to claim 1, wherein the card feed means comprise a pair of driver rollers, and wherein the rollers aid the deflecting means in pushing the trailing edge of the card past the card retention means and onto a card stack.

7. An apparatus according to claim 1, wherein the card stack tensioning means comprise a weight slidably mounted on a rail.

8. A card output hopper apparatus for stacking and sorting cards, comprising:
   a plurality of opposed stacking trays for receiving and retaining cards in a card stack;
   a plurality of card deflecting means comprising a rotatable slotted deflector arm associated with each pair of opposed trays for pushing cards toward the associated stacking trays;
   a plurality of card feeding means for delivering cards to the card deflecting means, wherein the card feeding means comprises a pair of feed rollers associated with each deflector arm for delivering the card to the associated deflector arm and wherein the roller nearest a desired card tray drives the trailing edge of the card toward the desired card tray; and
   card tensioning means for pressing cards against adjacent cards on the card stack in each stacking tray.

9. An apparatus according to claim 8, wherein the plurality of card deflecting means are driven by stepper motors.

10. An apparatus according to claim 8, wherein card feeding means comprise frictionally engaging roller pairs.

11. An apparatus according to claim 8, wherein each of the plurality of card deflecting means comprises a rotatable slotted deflector, the deflectors having three receiving positions including a first position wherein cards are deflected to a reject card stack; a second position wherein cards pass through the deflector slot; and a third position wherein cards are deflected to an acceptable card stack.

12. An apparatus according to claim 8, wherein both rollers of each roller pair are spring loaded for maintaining contact with the card and are driven for rolling the trailing edge of the card after a card has passed the nip of the rollers so that the rollers aid the deflecting means to push the trailing edge of the card past card retention means and onto a card stack.

13. An apparatus according to claim 8, wherein the card tensioning means comprises a weight slidably mounted on a rail providing for advancing along the stacking trays as cards are stacked.

14. A method of deflecting and driving cards onto opposed laterally extending card trays comprising the steps of:
   moving card deflecting means to a card receiving position whereat the card deflecting means is angled so that the cards are deflected toward a preselected card stack in the preselected card stack's tray;
   advancing a card to a face of the card deflecting means moved to a card receiving position so that the card deflects toward the preselected card stack upon engaging the face of the card deflecting means; and
   rotating the card deflecting means thereby pushing the card past a card tray retainer and onto the preselected card stack and driving the trailing edge of the card onto the card tray with a roller provided for advancing the card.

15. A method of deflecting and driving cards into opposed card trays extending laterally from a center line, and advancing cards along the center line comprising the steps of:
   moving rotatable deflecting and driving means, having a slot extending therethrough, to a receiving position wherein for passing a card straight through the card deflecting and driving means and along the center line, the deflecting and driving means is maintained in a center position aligning with the center line, and wherein for driving a card to one of the opposing card trays, the card deflecting and driving means is moved to a receiving position so that the card deflecting and driving means is angled away from a preselected card tray to deflect a card toward the preselected card tray;

feeding a card to the card deflecting and driving means; and wherein for passing a card along the center line, maintaining the card deflecting and driving means in a center position aligning with the center line so that the card passes through the slot, and wherein for driving a card onto one of the opposing stacks, after the card is deflected toward the preselected card tray pushing the card deflecting and driving means toward the preselected card tray, thereby pushing the card into the card tray and driving the trailing edge of the card into the card tray with a roller.

16. A method of deflecting and driving cards onto card stacks comprising the steps of:

delivering a card onto a rotatable deflecting arm, wherein the card is driven by a feed roller set pinching the card between the rollers of the feed roller set;

rotating the deflecting arm to a receiving position so that the card driven onto the deflecting arm is deflected toward a preselected card stack;

rotating the deflecting arm toward the preselected card stack, sweeping the card before the deflecting arm;

driving a trailing edge of the card toward the preselected card stack with a roller of the feed roller set nearest the preselected card stack; and pushing the card before the deflecting arm and past a card stack retainer and onto the preselected card stack.

17. An output hopper apparatus receiving cards passed through card processing stations and delivering the cards to card stacks,. comprising:

(a) deflector arm means, wherein the deflector arm means rotates from a receiving position so that a card fed to the deflector arm means deflects toward a preselected card stack and pushes the card before the deflector arm means and onto the preselected stack;

(b) feed roller means adapted for pinching a card between a pair of feed rollers for advancing cards to the deflector arm means and adapted for pushing a trailing edge of the card onto the preselected card stack with the feed roller nearest the preselected card stack;

(c) card retention means receiving cards from the deflector arm means and maintaining the cards in a stacked configuration.

18. An output hopper apparatus for receiving cards passed through card processing stations, the card processing stations having card sensing means determining a status of each card as acceptable or rejected comprising:

(a) card deflecting means in communication with the card sensing means for deflecting the cards toward a card stack and rotating to drive the cards onto the card stack wherein the card deflecting means comprises a rotatable deflector arm having two receiving positions, for deflecting to a reject card stack or an acceptable card stack;

(b) card feed means for advancing the cards to the card deflecting means;

(c) card retention means for preventing cards in the card stack from obstructing a path swept by the card deflecting means, so that the cards are maintained in the card stack in sequence; and (d) card stack tensioning means pressing each card against adjacent cards in the card stack.

* * * * *